(12) United States Patent
Yang

(10) Patent No.: US 8,898,662 B2
(45) Date of Patent: Nov. 25, 2014

(54) METHOD AND DEVICE FOR GENERATING SOFTWARE INSTALLATION PACKET

(75) Inventor: Honggang Yang, Shenzhen (CN)

(73) Assignee: ZTE Corporation, Shenzen (CN)

( * ) Notice: Subject to any disclaimer, the term of this patent is extended or adjusted under 35 U.S.C. 154(b) by 325 days.

(21) Appl. No.: 13/384,596

(22) PCT Filed: May 17, 2010

(86) PCT No.: PCT/CN2010/072837
§ 371 (c)(1),
(2), (4) Date: Jan. 17, 2012

(87) PCT Pub. No.: WO2011/091631
PCT Pub. Date: Aug. 4, 2011

(65) Prior Publication Data
US 2012/0159470 A1    Jun. 21, 2012

(30) Foreign Application Priority Data

Jan. 27, 2010  (CN) .......................... 2010 1 0103114

(51) Int. Cl.
| | | |
|---|---|---|
| H04N 7/167 | (2011.01) | |
| G06K 9/36 | (2006.01) | |
| G06K 9/46 | (2006.01) | |
| G06F 12/00 | (2006.01) | |
| G06F 17/30 | (2006.01) | |
| G06F 9/44 | (2006.01) | |
| G06F 9/445 | (2006.01) | |

(52) U.S. Cl.
CPC ....................................... *G06F 8/61* (2013.01)
USPC ........... 717/175; 380/243; 382/232; 382/235; 382/236; 707/827; 717/168; 717/177

(58) Field of Classification Search
None
See application file for complete search history.

(56) References Cited

U.S. PATENT DOCUMENTS

| | | | | |
|---|---|---|---|---|
| 5,774,715 | A * | 6/1998 | Madany et al. ........................ 1/1 |
| 6,282,711 | B1 * | 8/2001 | Halpern et al. ............... 717/175 |
| 6,493,871 | B1 * | 12/2002 | McGuire et al. .............. 717/173 |
| 6,522,268 | B2 * | 2/2003 | Belu .............................. 341/51 |

(Continued)

FOREIGN PATENT DOCUMENTS

| | | |
|---|---|---|
| CN | 1713147 | 12/2005 |
| CN | 1777317 | 5/2006 |
| CN | 101296458 | 10/2008 |

OTHER PUBLICATIONS

PCT/CN2010/072837, International Search Report, Nov. 11, 2010.

(Continued)

*Primary Examiner* — Don Wong
*Assistant Examiner* — Anibal Rivera
(74) *Attorney, Agent, or Firm* — Kunzler Law Group

(57) ABSTRACT

A method and device for generating a software installation package is disclosed in the present invention. The method includes: in the process of generating the software installation package, a plurality of support library files required to develop the software are divided according to file types, and the support library files of the same type are compressed together, and the compressed support library files of the same type are located in the same one part of the software installation package. By adopting the present invention, the size of APP installation packages can be reduced greatly, the network propagation speeds up greatly when applied to the network transmission field, and flash space, as well as the cost, is greatly reduced when the software installation packages are written into flash directly.

18 Claims, 5 Drawing Sheets

(56) References Cited

U.S. PATENT DOCUMENTS

| | | | |
|---|---|---|---|
| 6,675,382 B1* | 1/2004 | Foster | 717/177 |
| 6,976,253 B1* | 12/2005 | Wierman et al. | 717/177 |
| 7,367,027 B1* | 4/2008 | Chen et al. | 717/168 |
| 7,492,953 B2* | 2/2009 | Anderson et al. | 382/235 |
| 7,661,102 B2* | 2/2010 | Ogle | 717/168 |
| 7,805,719 B2* | 9/2010 | O'Neill | 717/168 |
| 8,418,167 B2* | 4/2013 | Meller et al. | 717/169 |
| 8,495,622 B2* | 7/2013 | Redpath | 717/175 |
| 2003/0182563 A1* | 9/2003 | Liu et al. | 717/168 |
| 2004/0177356 A1 | 9/2004 | Westendorf et al. | |
| 2005/0125524 A1* | 6/2005 | Chandrasekhar et al. | 709/223 |
| 2005/0172284 A1* | 8/2005 | Dandekar et al. | 717/175 |
| 2005/0281469 A1* | 12/2005 | Anderson et al. | 382/232 |
| 2006/0039618 A1* | 2/2006 | Ogle | 382/236 |
| 2006/0190939 A1* | 8/2006 | Chen et al. | 717/168 |
| 2007/0050762 A1* | 3/2007 | Chen et al. | 717/169 |
| 2007/0294686 A1* | 12/2007 | Oh | 717/168 |
| 2009/0240745 A1* | 9/2009 | Stahl et al. | 707/204 |
| 2010/0198889 A1* | 8/2010 | Byers et al. | 707/827 |
| 2011/0311046 A1* | 12/2011 | Oka | 380/243 |

OTHER PUBLICATIONS

Hsu, William H. and Zwarico, Amy E., Automatic Synthesis of Compression Techniques for Heterogeneous Files, Software-Practice and Experience, vol. 25(10), 1097-1116 (Oct. 1995).

IBM Technical Disclosure Bulletin, Table-Driven Selective Software Download, vol. 32 No. 9B (Feb. 1990).

* cited by examiner

METHOD AND DEVICE FOR GENERATING SOFTWARE INSTALLATION PACKET

FIELD OF THE INVENTION

The scheme relates to wireless communication field, and more specifically, to a method and device for generating software installation package.

BACKGROUND

As shown in FIG. 1, a existing software installation package is mainly composed of two parts, and the first part (Packages part) includes an application program (App) part, and also includes a driver (Drv) part when required. The App part is composed of user interface (U") compiler compiled by use of the development tool and a UI support library file required to run UI compiler (also called developing the software installation package), and Dry part is composed of a device driver installation package; the second part (Resources) is composed of UI support related part and running script, wherein, the UI support relevant part includes pictures, sounds, multi-language support library and other files required to install the software, and the running script is used to control the relevant action required to be executed after the Packages part is installed to the terminal equipment, such as the relevant action for changing the system settings or setting the UI start and operating according to system condition and so on.

At present, the telecommunication field changes quickly, the personal computer (PC) management software of wireless terminal equipment is required to support multiple operating systems (such as the mainstream operating system Windows®, MAC® and Linux®). A cross-platform language is a good choice, but the support of these languages to different versions of the operating systems is insufficient, therefore, the support library of the used language is required to be imbedded into installation package for compatibility. This will bring the problems that the installation package is very large and the need of a practical application is not satisfied.

SUMMARY

The technical problem to be solved by the present invention is to provide a method for generating a software installation package in order to overcome the defects that the software installation package takes up too large space when the support library is larger in the prior art.

In order to solve the above problem, the present invention is to provide a method for generating software installation package, comprising:

in a process of generating the software installation package, dividing a plurality of support library files required to develop that software according to file types, and then compressing the support library files of same type together and locating the compressed support library files of the same type in a same one part of the software installation package.

The above generating method also has the following features:

the step of locating the compressed support library files of the same type in the same one part of the software installation package comprises: when generating a Packages part, making other types of compressed support library files except a type of compressed support library files taking up largest space and user interface (UI) compiler together into an application program (App) part; when generating a Resources part, adding the type of compressed support library files taking up the largest space to the Resources part.

The generating method further comprises:

when generating the Resources part, adding decompression software which can decompress the compressed support library files of the same type to the Resources part.

The generating method further comprises:

when generating the Resources part, adding a running script to the Resources part; wherein, the running script is configured to control a terminal to carry out operation according to the following process after the Packages part is installed to the terminal: copying the decompression software included in the Resources part and the compressed support library files of the same type to the terminal, and then carrying out decompression operation respectively on the compressed support library files of the same type of the Resources part and the Packages part stored in the terminal by using the decompression software; after completion of decompression operation, executing copying of UI support relevant part and relevant subsequent operations.

The generating method further comprises:

when generating the Resources part, adding the running script to the Resources part;

wherein, the running script is configured to control the terminal to carry out and operation according to following process after the Packages part is installed to the terminal: firstly judging whether there are all support library files required to develop that software in the terminal, and if yes, directly executing the copying of the UI support relevant part and the relevant subsequent operations, and if no, copying the decompression software included in the Resources part and the compressed support library files of the same type to the terminal, and then carrying out the decompression operation respectively on the compressed support library files of the same type of the Resources part and the Packages part stored in the terminal by using the decompression software; after completion of decompression operation, executing the copying of the UI support relevant part and the relevant subsequent operations.

The generating method also has the following features:

the step of compressing the support library files of the same type together comprises: compressing the support library files of the same type together by using a 7z compression software;

the step of adding the decompression software which can decompress the compressed support library files of the same type to the Resources part comprises: adding the 7z compression software to the Resources part.

The present invention also provides a device for generating a software installation package, comprising:

a division unit configured to divide a plurality of support library files required to develop that software according to file types;

a compression unit configured to compress the support library files of same type together; and a generation unit configured to locate the compressed support library files of the same type in a same one part of software installation package.

Wherein, the generation unit is configured to: when generating a Packages part, make other types of compressed support library files except a type of compressed support library files taking up largest space and UI compiler together into an App part;

when generating a Resources part, to add the type of compressed support library files taking up the largest space to the Resources part.

Wherein, the generation unit is also configured to: when generating the Resources part, add decompression software which can decompress the compressed support library files of the same type to the Resources part.

Wherein, the generation unit is also configured to: when generating the Resources part, add a running script to the Resources part;

wherein, the running script is configured to control a terminal to carry out operation according to following process after the Packages part is installed to the terminal: copying the decompression software included in the Resources part and the compressed support library files of the same type to the terminal, and then carrying out decompression operation respectively on the compressed support library files of the same type of the Resources part and the Packages part stored in the terminal by using the decompression software; after completion of decompression operation, executing copying of UI support relevant part and relevant subsequent operations.

Wherein, the generation unit is also configured to: when generating the Resources part, add the running script to the Resources part;

wherein, the running script is configured to control the terminal to carry out operation according to following process after the Packages part is installed to the terminal: firstly judging whether there are all support library files required to develop that software in the terminal, and if yes, executing the copying of the UI support relevant part and the relevant subsequent operations directly; if no, copying the decompression software included in the Resources part and the compressed support library files of the same type to the terminal, and then carrying out the decompression operation respectively on the compressed support library files of the same type of the Resources part and the Packages part stored in the terminal by using the decompression software; after completion of decompression operation, executing the copying of the UI support relevant part and the relevant subsequent operations.

After adopting the present invention, the size of APP installation packages can be reduced greatly, and the network propagation speeds up greatly when it is applied to network transmission field; and the flash space, as well as the cost, is greatly reduced when the software installation packages are written into flash directly.

DETAILED DESCRIPTION

When files of the same type are compressed together, the compression ratio is the largest. Therefore, according to the rule, the basic idea of a method according to the present invention is: in the process of generating a software installation package, dividing a plurality of support library files required to develop the software according to file types, and then compressing the support library files of the same type together, and locating the compressed support library files of the same type in the same one part of the software installation package. Wherein, the files of same type of the present invention refer to the files with the same file name suffix.

Figure 1:
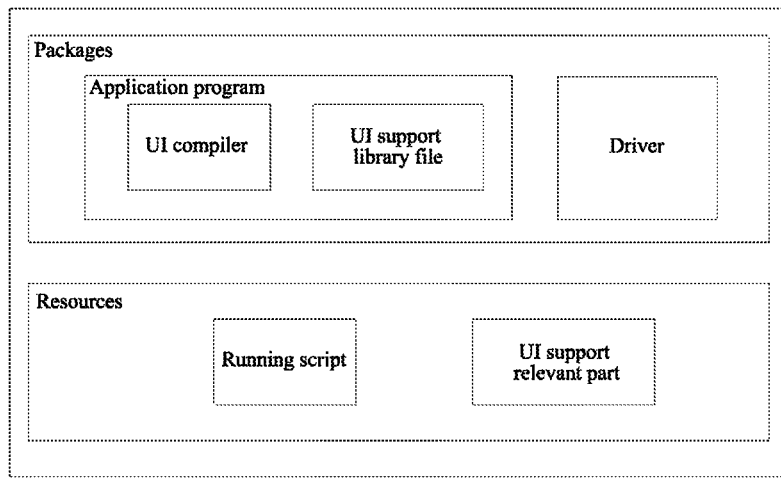
FIG. 1 is an organization structural diagram of the software installation package in related art.
Figure 2:
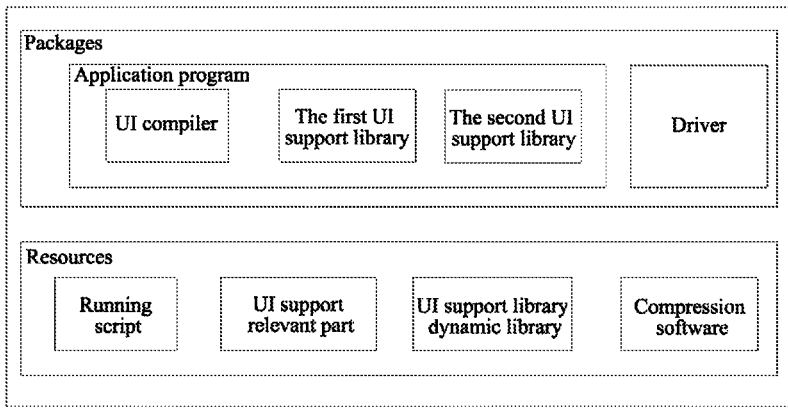
FIG. 2 is an organization structural diagram of the software installation package according to the embodiment of the present invention.

According to the rule that the easily controlled files are easy to be decompressed in the running script during the installation, the way that the compressed support library files of the same type are located in the same one part of the software installation package, can be realized as follows: when generating the Packages part, making other types of compressed support library files except a type of compressed support library file taking up the largest space and UI compiler together into the App part; when generating the Resources part, adding a kind of compressed support library file taking up the largest space to the Resources part. As shown in FIG. 2, after division and compression, the UI support library file is divided into three parts, wherein a part is stored in the first UI support library, and another part is stored in the second UI support library, and the part taking up the largest space is stored in the UI support library dynamic library.

Since the compression operation is carried out for the support library files in the process of generating the software installation package, the decompression operation is required to be carried out for these support library files in the process of installing the software package. Therefore, in order to facilitate the use for user, when generating the Resources part, the decompression software which can decompress the above compressed files, is also added to the Resources part together.

As mentioned above, the running script of the Resources part is used to control the relevant action which requires executing after the Packages part is installed to the terminal, and since the compression operation is carried out for the support library files of the same type when generating the software installation package and the corresponding decompression operation is also required during the installation, the specified action execution process in the running script is required to be rearranged in order to facilitate the installation after the installation package is generated by using the method for generating the software installation package. Thereby, the following process is required to be added to the running script, comprising: copying the decompression software included in the Resources part and the compressed support library files of the same type to the terminal, and then carrying out the decompression operation on the compressed support library files of the same type of the Resources part and the Packages part stored in the terminal by using the decompression software. After the completion of decompression operation, execute the copying of the UI support relevant part and the relevant subsequent operations, and implementation herein may refer to the prior art and it is no longer to be illustrated.

In order to further improve the efficiency of the installation and save the resources of the terminal, the following process can be further added in the process defined in the above running script: firstly judging whether there are all support library files required to develop the software in the terminal, and if yes, executing the copying of the UI support relevant part and the relevant subsequent operations directly; otherwise, executing the operation of copying the decompression software included in the Resources part and the compressed support library files of the same type to the terminal and subsequent process.

An application example of the present invention is further illustrated below.

Figure 3:
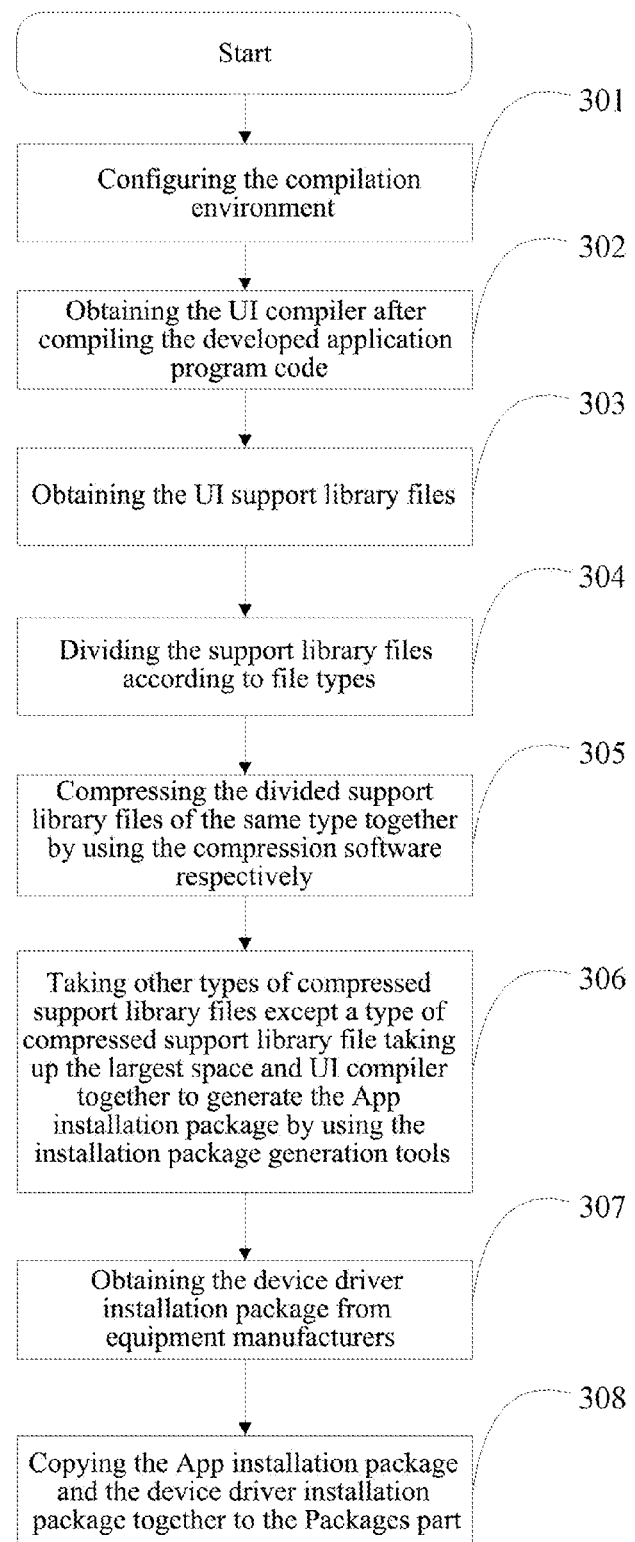
FIG. 3 is a construction flowchart of the Packages part according to the embodiment of the present invention.

The generation flowchart of the Packages part in the software installation package, as shown in FIG. 3, includes the following steps:

S301: configuring the development compilation environment according to the development tool of the language used by the system, and installing the support software (such as python™, wxPython™, glib™ and so on) required for development;

S302: obtaining the UI compiler after compiling the developed application program code;

S303: carrying out cutting on the development support software installed in the development machine to obtain the support library files, so that the UI compiler can be run normally in the machine which does not install the support software required for development;

S304: dividing the above support library files according to file types;

S305: respectively compressing the divided support library files of the same type together by using the compression software with a higher compression ratio;

S306: making other types of compressed support library files except a type of compressed support library file taking up the largest space and UI compiler together into the App installation package by using the installation package generation tools such as InstallShield®, PackageMaker® and so on; wherein, the App installation package part is the most important part in the Packages part, and it can interact with users directly, which is the main characteristic different from other applications.

S307: if a driver is required, obtaining the device driver installation package from equipment manufacturers;

S308: copying the App installation package and device driver installation package together to the Packages part.

Figure 4:
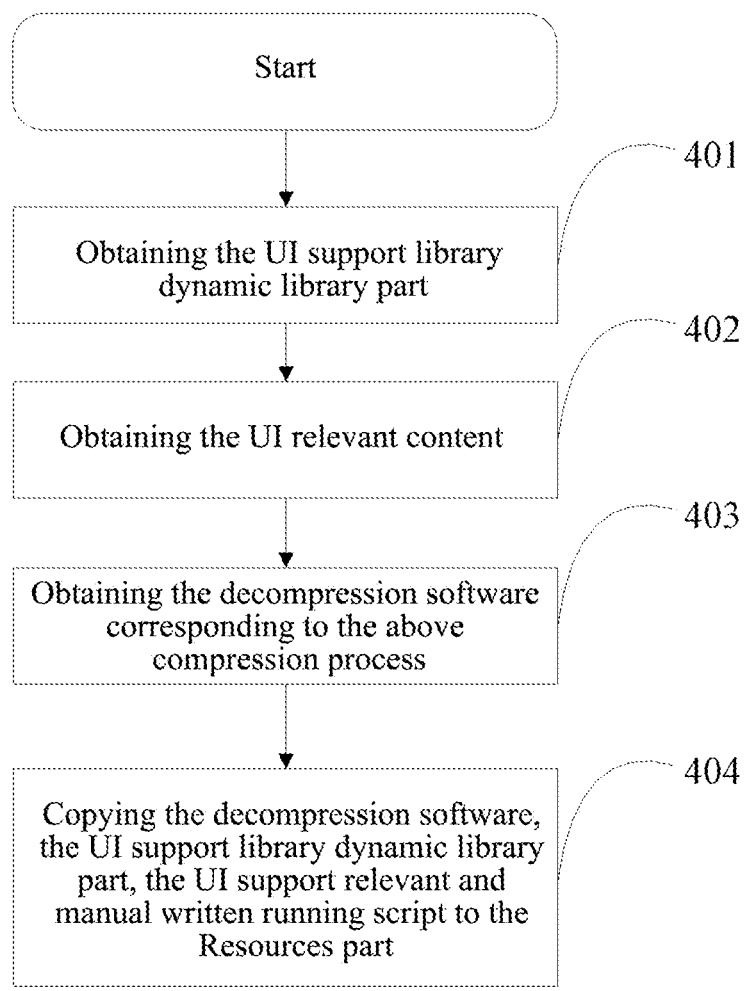
FIG. 4 is a construction flowchart of the Resources part according to the embodiment of the present invention.

The generation process of the Resources part in the software installation package, as shown in FIG. 4, includes the following steps:

S401: obtaining the UI support library dynamic library part from the step S305, that is a type of support library files taking up the largest space after compression;

S402: obtaining the UI relevant content, such as service program or UI background support program and so on (generally provided by a third party or special UI design department).

Figure 5:
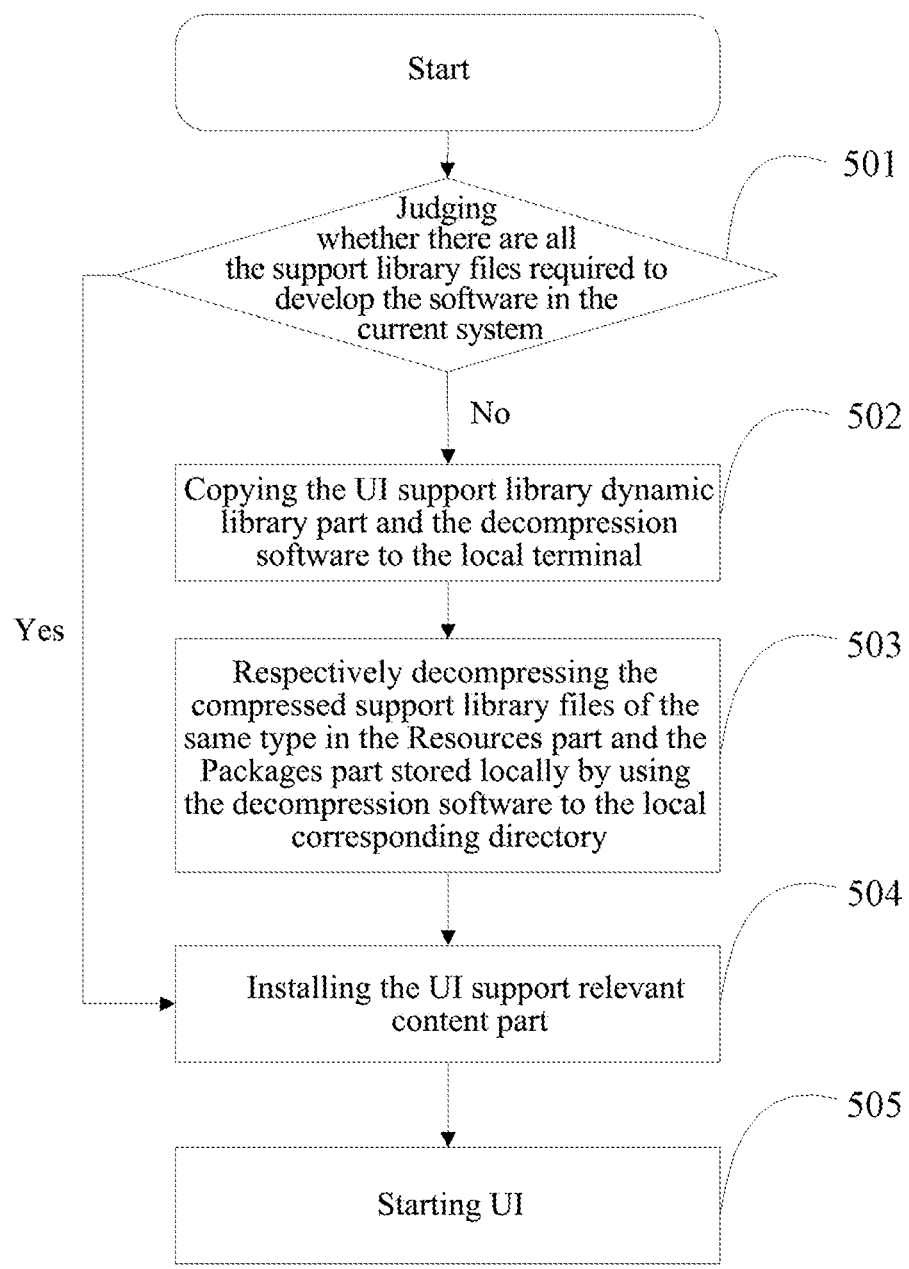
FIG. 5 is a flowchart of installation process of executing the script control according to the embodiment of the present invention.

S403: obtaining the decompression software corresponding to the compression process of step S305;

S404: copying the above decompression software, the UI support library dynamic library part, the UI support library relevant and manual written running script to the Resources part; wherein, as shown in FIG. 5, after the Packages part defined in the manual written running script is installed to the terminal, the specific process is executed in the terminal as follows:

S501: judging whether there are all the support library files required to develop the software in the current system (which can be implemented through judging whether there are required files in the registry or system path), and if yes, executing the step S504, otherwise executing the next step;

S502: copying the UI support library dynamic library part and the decompression software to the local terminal;

S503: respectively decompressing the compressed support library files of the same type in the Resources part and the Packages part stored locally by using the decompression software to the local corresponding directory;

S504: installing the UI support relevant content part;

S505: starting UI.

After having generated the Resources part and the Packages part, the Resources part and the Packages part generated in the steps S308 and S404 are made into the final software installation package again by using installation package generation tools (such as InstallShield, PackageMaker and so on).

Figure 6:
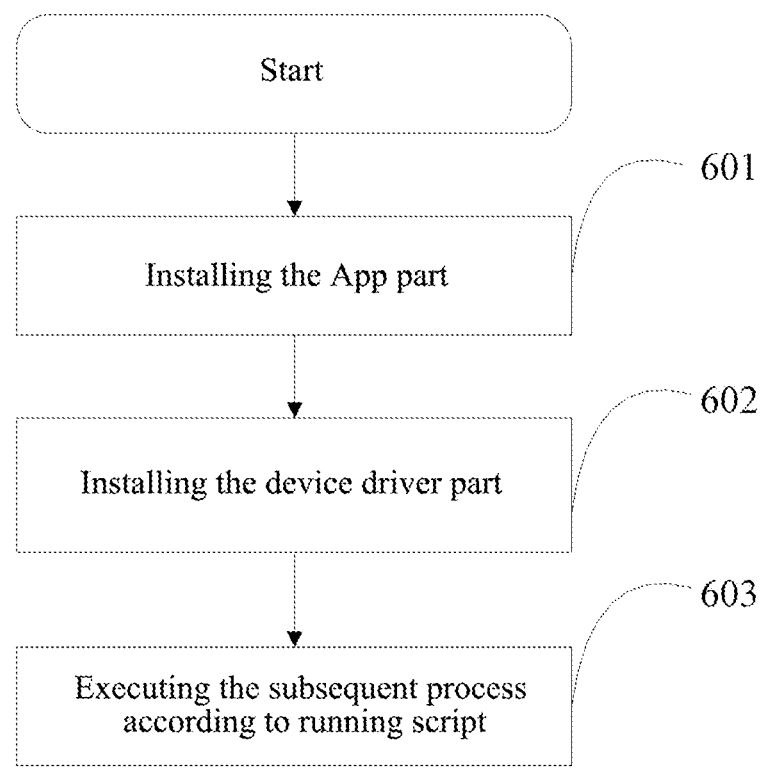
FIG. 6 is a flowchart of the software installation process according to the embodiment of the present invention.

The present invention is applicable to the conditions of requiring the installation package with small capacity and larger application program running support library. Take the implementation of scheme in the wxPython application program installation package for example. Firstly, the wxPython application program needs to be put into the support library of Python and wxPython, the files of same type are separated into two parts of the dynamic library and py file. Secondly, the used compression software is the 7z compression software, the performance parameter of which are: compression level—extreme compression, compression mode—LZMA (Lempel-Ziv-Markov chain-Algorithm), dictionary size—64M, word size—128 characters, and supporting multi-threading which can further improve the decompression speed. According to the above process of specific implementation (as shown in FIG. 6), the specific installation process includes the following steps after obtaining the software installation package:

S601: installing App part, which includes the UI compiler, the py part supported by python and wxPython;

S602: installing the device driver part;

S603: executing the subsequent process according to running script, and the installation content and process are as the description of S501-S505.

A device for generating software installation package comprises:

a division unit, configured to divide a plurality of support library files required to develop that software according to file types;

a compression unit, configured to compress the support library files of same type together; and a generation unit, configured to locate the compressed support library files of the same type in the same one part of software installation package.

Wherein, the generation unit is configured to: when generating the Packages part, other types of compressed support library files except a type of compressed support library files taking up the largest space and UI compiler together are made into an App part; and when generating a Resources part, to add the type of compressed support library files taking up the largest space to the Resources part.

Wherein, the generation unit is also configured to: when generating the Resources part, add decompression software which can decompress the compressed support library files of the same type to the Resources part.

Wherein, the generation unit is also configured to: when generating the Resources part, add a running script to the Resources part;

wherein the running script is configured to control a terminal to carry out an operation according to following process after the Packages part is installed to the terminal: copying the decompression software included in the Resources part and the compressed support library files of the same type to the terminal, and then carrying out decompression operation respectively on the compressed support library files of the same type of the Resources part and the Packages part stored in the terminal by using the decompression software; after completion of decompression operation, executing the copying of UI support relevant part and relevant subsequent operations.

Wherein, the generation unit is also configured to, when generating the Resources part, add the running script to the Resources part;

wherein the running script is configured to control the terminal to carry out an operation according to following process after the Packages part is installed to the terminal:

firstly judging whether there are all support library files required to develop that software in the terminal, and if yes, executing the copying of the UI support relevant part and the relevant subsequent operations directly; if no, copying the decompression software included in the Resources part and the compressed support library files of the same type to the terminal, and then carrying out the decompression operation respectively on the compressed support library files of the same type of the Resources part and the Packages part stored in the terminal by using the decompression software; after completion of decompression operation, executing the copying of the UI support relevant part and the relevant subsequent operations.

Similarly the scheme can be applied to the software installation package with other larger support libraries, such as python software, Java software support library, glib library, video encode and decode library, QT support library and so on, and the choice of compression software depends on the size of the installation package that can be accepted, the better compression algorithms are 7z, zip, bz2 and so on.

Of course, the present invention can also have a variety of other embodiments, without departing from the spirit and essence of the present invention, a person skilled in the art can make the corresponding change and deformation according to the present invention, but these corresponding change and deformation should belong to the protection scope of appended claims in the present invention.

INDUSTRIAL APPLICABILITY

By adopting the present invention, the size of APP installation packages can be reduced greatly, and the network propagation speeds up greatly when it is applied to network transmission field; and the flash space, as well as the cost, is greatly reduced when the software installation packages are written into flash directly.

What is claimed is:

1. A method for generating software installation package, comprising:
   in a process of generating the software installation package, dividing a plurality of support library files required to develop that software according to file types, and then compressing the support library files of same type together, and locating compressed support library files of the same type in a same one part of the software installation package,
   wherein, the step of locating the compressed support library files of the same type in the same one part of the software installation package comprises:
      when generating a Packages part, making other types of compressed support library files except a type of compressed support library files taking up largest space and user interface (UI) compiler together into an application program (App) part; and
      when generating a Resources part, adding the type of compressed support library files taking up the largest space to the Resources part.

2. The method according to claim 1, the method further comprising:
   when generating the Resources part, adding decompression software which can decompress the compressed support library files of the same type to the Resources part.

3. The method according to claim 2, the method further comprising:
   when generating the Resources part, adding a running script to the Resources part;
   wherein, the running script is configured to control a terminal to carry out operation according to following process after the Packages part is installed to the terminal: copying the decompression software included in the Resources part and the compressed support library files of the same type to the terminal, and then carrying out decompression operation respectively on the compressed support library files of the same type of the Resources part and the Packages part stored in the terminal by using the decompression software; after completion of decompression operation, executing copying of UI support relevant part and relevant subsequent operations.

4. The method according to claim 2, the method further comprising:
   when generating the Resources part, adding a running script to the Resources part;
   wherein, the running script is configured to control a terminal to carry out operation according to following process after the Packages part is installed to the terminal: firstly judging whether there are all support library files required to develop that software in the terminal, and if yes, directly executing copying of UI support relevant part and relevant subsequent operations; if no, copying the decompression software included in the Resources part and the compressed support library files of the same type to the terminal, and then carrying out decompression operation respectively on the compressed support library files of the same type of the Resources part and the Packages part stored in the terminal by using the decompression software; after completion of decompression operation, executing the copying of the UI support relevant part and the relevant subsequent operations.

5. The method according to claim 2, wherein,
   the step of compressing the support library files of the same type together comprises: compressing the support library files of the same type together by using a 7z compression software;
   the step of adding the decompression software which can decompress the compressed support library files of the same type to the Resources part comprises: adding the 7z compression software to the Resources part.

6. The method according to claim 1, the method further comprising:
   when generating a Resources part, adding decompression software which can decompress the compressed support library files of the same type to the Resources part.

7. The method according to claim 6, the method further comprising:
   when generating the Resources part, adding a running script to the Resources part;
   wherein, the running script is configured to control a terminal to carry out operation according to following process after a Packages part is installed to the terminal: copying the decompression software included in the Resources part and the compressed support library files of the same type to the terminal, and then carrying out decompression operation respectively on the compressed support library files of the same type of the Resources part and the Packages part stored in the terminal by using the decompression software; after completion of decompression operation, executing copying of UI support relevant part and relevant subsequent operations.

8. The method according to claim 6, the method further comprising:

when generating the Resources part, adding a running script to the Resources part;

wherein, the running script is configured to control a terminal to carry out operation according to following process after a Packages part is installed to the terminal: firstly judging whether there are all support library files required to develop that software in the terminal, and if yes, directly executing copying of UI support relevant part and relevant subsequent operations; if no, copying the decompression software included in the Resources part and the compressed support library files of the same type to the terminal, and then carrying out decompression operation respectively on the compressed support library files of the same type of the Resources part and the Packages part stored in the terminal by using the decompression software; after completion of decompression operation, executing the copying of the UI support relevant part and the relevant subsequent operations.

9. The method according to claim 6, wherein, the step of compressing the support library files of the same type together comprises:

compressing the support library files of the same type together by using a 7z compression software;

the step of adding the decompression software which can decompress the compressed support library files of the same type to the Resources part comprises: adding the 7z compression software to the Resources part.

10. A device for generating software installation package, comprising:

a processor;

a division unit executing on the processor, configured to divide a plurality of support library files required to develop that software according to file types;

a compression unit executing on the processor, configured to compress the support library files of same type together; and a generation unit executing on the processor, configured to locate compressed support library files of the same type in a same one part of software installation package, wherein the generation unit is configured to:

when generating a Packages part, make other types of compressed support library files except a type of compressed support library files taking up largest space and user interface (UI) compiler together into an application program (App) part; and when generating a Resources part, add the type of compressed support library files taking up the largest space to the Resources part.

11. The device according to claim 10, wherein, the generation unit is also configured to:

when generating the Resources part, add decompression software which can decompress the compressed support library files of the same type to the Resources part.

12. The device according to claim 11, wherein, the generation unit is also configured to:

when generating the Resources part, add a running script to the Resources part;

wherein, the running script is configured to control a terminal to carry out operation according to following process after the Packages part is installed to the terminal: copying the decompression software included in the Resources part and the compressed support library files of the same type to the terminal, and then carrying out decompression operation respectively on the compressed support library files of the same type of the Resources part and the Packages part stored in the terminal by using the decompression software; after completion of decompression operation, executing copying of UI support relevant part and relevant subsequent operations.

13. The device according to claim 11, wherein, the generation unit is also configured to:

when generating the Resources part, add a running script to the Resources part;

wherein, the running script is configured to control a terminal to carry out operation according to following process after the Packages part is installed to the terminal: firstly judging whether there are all support library files required to develop that software in the terminal, and if yes, executing copying of UI support relevant part and relevant subsequent operations directly; if no, copying the decompression software included in the Resources part and the compressed support library files of the same type to the terminal, and then carrying out decompression operation respectively on the compressed support library files of the same type of the Resources part and the Packages part stored in the terminal by using the decompression software; after completion of decompression operation, executing the copying of the UI support relevant part and the relevant subsequent operations.

14. The device according to claim 11, wherein, the compression unit is configured to: compress the support library files of the same type together by using a 7z compression software;

the generation unit is configured to add the decompression software which can decompress the compressed support library files of the same type to the Resources part by following way: adding the 7z compression software to the Resources part.

15. The device according to claim 10, wherein, the generation unit is also configured to:

when generating a Resources part, add decompression software which can decompress the compressed support library files of the same type to the Resources part.

16. The device according to claim 15, wherein, the generation unit is also configured to:

when generating the Resources part, add a running script to the Resources part;

wherein, the running script is configured to control a terminal to carry out operation according to following process after a Packages part is installed to the terminal: copying the decompression software included in the Resources part and the compressed support library files of the same type to the terminal, and then carrying out decompression operation respectively on the compressed support library files of the same type of the Resources part and the Packages part stored in the terminal by using the decompression software; after completion of decompression operation, executing copying of UI support relevant part and relevant subsequent operations.

17. The device according to claim 15, wherein, the generation unit is also configured to:

when generating the Resources part, add a running script to the Resources part;

wherein, the running script is configured to control a terminal to carry out operation according to following process after a Packages part is installed to the terminal: firstly judging whether there are all support library files required to develop that software in the terminal, and if yes, executing copying of UI support relevant part and relevant subsequent operations directly; if no, copying the decompression software included in the Resources part and the compressed support library files of the same type to the terminal, and then carrying out decompression operation respectively on the compressed support library files of the same type of the Resources part and the Packages part stored in the terminal by using the decompression software; after completion of decompression operation, executing the copying of the UI support relevant part and the relevant subsequent operations.

18. The device according to claim 15, wherein, the compression unit is configured to: compress the support library files of the same type together by using a 7z compression software;

the generation unit is configured to add the decompression software which can decompress the compressed support library files of the same type to the Resources part by following way: adding the 7z compression software to the Resources part.

* * * * *